United States Patent
Inagi et al.

(10) Patent No.: US 8,534,327 B2
(45) Date of Patent: Sep. 17, 2013

(54) GAS CHARGING APPARATUS AND GAS CHARGING METHOD

(75) Inventors: Shusuke Inagi, Okazaki (JP); Natsuru Miyazaki, Toyota (JP); Chihiro Uchimura, Toyota (JP); Akira Yamashita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/259,875

(22) PCT Filed: Jun. 30, 2010

(86) PCT No.: PCT/JP2010/061147
§ 371 (c)(1),
(2), (4) Date: Sep. 23, 2011

(87) PCT Pub. No.: WO2011/058782
PCT Pub. Date: May 19, 2011

(65) Prior Publication Data
US 2012/0216910 A1   Aug. 30, 2012

(30) Foreign Application Priority Data
Nov. 16, 2009   (WO) .................. PCT/JP2009/006128

(51) Int. Cl.
*B65B 3/26* (2006.01)
(52) U.S. Cl.
USPC ....... 141/4; 141/39; 141/83; 141/95; 141/197
(58) Field of Classification Search
USPC .......... 141/2, 4, 69, 83, 94–95, 98, 197–198, 141/231, 39
See application file for complete search history.

(56) References Cited

U.S. PATENT DOCUMENTS

| | | | | |
|---|---|---|---|---|
| 4,527,600 A | * | 7/1985 | Fisher et al. | 141/4 |
| 5,564,306 A | * | 10/1996 | Miller | 73/861 |
| 5,570,729 A | * | 11/1996 | Mutter | 141/18 |

(Continued)

FOREIGN PATENT DOCUMENTS

| JP | 9-250696 | 9/1997 |
|---|---|---|
| JP | 2003-269693 | 9/2003 |

(Continued)

OTHER PUBLICATIONS

International Search Report in International Application No. PCT/JP2010/061147; Mailing Date: Oct. 12, 2010.

*Primary Examiner* — Timothy L Maust
*Assistant Examiner* — Timothy P Kelly
(74) *Attorney, Agent, or Firm* — Finnegan, Henderson, Farabow, Garrett & Dunner, LLP

(57) ABSTRACT

A gas charging apparatus includes a gas supply source; a fuel gas charging line L connected to the gas supply source, to charge a fuel gas into gas tanks, respectively; a temperature information acquiring section which acquires temperature information in the gas tanks; a pressure information acquiring section which acquires pressure information in the gas tanks; a relation data acquiring section which acquires correspondence relation data indicating a correspondence relation between a temperature and a pressure in the corresponding gas tank; a temperature difference calculating section which calculates a temperature difference between the gas tank having the highest internal temperature and the gas tank having the lowest internal temperature among the plurality of gas tanks; and a control section which performs control so as to stop the charging of the fuel gas.

9 Claims, 9 Drawing Sheets

(56) References Cited

U.S. PATENT DOCUMENTS

| | | | |
|---|---|---|---|
| 5,628,349 A * | 5/1997 | Diggins et al. | 141/3 |
| 5,810,058 A * | 9/1998 | Kountz et al. | 141/83 |
| 5,881,779 A * | 3/1999 | Kountz et al. | 141/83 |
| 6,598,624 B2 * | 7/2003 | Togasawa et al. | 141/1 |
| 6,619,336 B2 * | 9/2003 | Cohen et al. | 141/83 |
| 6,672,340 B2 * | 1/2004 | Mutter | 141/4 |
| 7,059,364 B2 * | 6/2006 | Kountz et al. | 141/4 |
| 7,325,561 B2 * | 2/2008 | Mathison et al. | 137/256 |
| 7,575,012 B2 * | 8/2009 | Miki et al. | 137/1 |
| 8,020,589 B2 * | 9/2011 | Cohen et al. | 141/95 |
| 8,365,777 B2 * | 2/2013 | Farese et al. | 141/4 |
| 2007/0186982 A1 * | 8/2007 | Cohen et al. | 137/487.5 |
| 2010/0276031 A1 * | 11/2010 | Saiki et al. | 141/1 |
| 2010/0307636 A1 * | 12/2010 | Uemura | 141/4 |
| 2012/0000574 A1 * | 1/2012 | Nishiumi | 141/94 |
| 2012/0111447 A1 * | 5/2012 | Mori et al. | 141/4 |
| 2012/0125480 A1 * | 5/2012 | Inagi et al. | 141/4 |
| 2012/0125482 A1 * | 5/2012 | Mori | 141/98 |
| 2012/0205003 A1 * | 8/2012 | Okawachi | 141/95 |
| 2012/0227864 A1 * | 9/2012 | Mori | 141/95 |
| 2012/0267002 A1 * | 10/2012 | Kittilsen et al. | 141/4 |
| 2012/0298256 A1 * | 11/2012 | Mori | 141/94 |
| 2013/0014854 A1 * | 1/2013 | Mori | 141/1 |
| 2013/0014855 A1 * | 1/2013 | Mori | 141/1 |
| 2013/0052553 A1 * | 2/2013 | Inagi | 429/429 |

FOREIGN PATENT DOCUMENTS

| | | |
|---|---|---|
| JP | 2004-84808 | 3/2004 |
| JP | 2004-116619 | 4/2004 |
| JP | 2004-144128 | 5/2004 |
| JP | 2005-53358 | 3/2005 |
| JP | 2005-155869 | 6/2005 |

* cited by examiner

FIG.5

|  |  | In-tank pressure [MPA] | | | |
|---|---|---|---|---|---|
|  |  | 80 | 82 | 85 | 87.5 |
| In-tank temp. [°C] | 100 | 92.2 | 93.8 | 96.2 | 98.2 |
|  | 95 | 93.0 | 94.6 | 97.0 | 98.9 |
|  | 90 | 93.7 | 95.3 | 97.8 | 99.7 |
|  | 85 | 94.5 | 96.1 | 98.6 | 100.5 |
|  | 80 | 95.3 | 97.0 | 99.4 | 101.4 |
|  | 75 | 96.2 | 97.8 | 100.2 | 102.2 |
|  | 70 | 97.0 | 98.7 | 101.1 | 103.1 |

FIG.8

| 35MPa ambient | Recommended Avg Ramp Rate(min/43.8MPa) | | | | | | | |
|---|---|---|---|---|---|---|---|---|
| | Initial Tank Pressure (MPa) | | | | | | | |
| Initial Tank Temperature (°C) | 2 | 5 | 10 | 15 | 20 | 30 | 40 | >40 |
| ≧85 | no fueling | no fueling | no fueling | no fueling | no fueling | no fueling | no fueling | no fueling |
| 80 | 190 | 180 | 170 | 150 | 150 | 130 | 20 | no fueling |
| 75 | 110 | 110 | 100 | 95 | 90 | 80 | 3 | no fueling |
| 70 | 85 | 85 | 80 | 75 | 70 | 36 | 3 | no fueling |
| 65 | 75 | 75 | 70 | 60 | 50 | 10 | 3 | no fueling |
| 60 | 65 | 65 | 55 | 45 | 34 | 3 | 3 | no fueling |
| 55 | 60 | 55 | 45 | 34 | 22 | 3 | 3 | no fueling |
| 50 | 50 | 45 | 35 | 25 | 14 | 3 | no fueling | no fueling |
| 45 | 45 | 36 | 28 | 19 | 9 | 3 | no fueling | no fueling |
| 40 | 35 | 30 | 22 | 14 | 5 | 3 | no fueling | no fueling |
| 35 | 30 | 25 | 18 | 10 | 3 | 3 | no fueling | no fueling |
| 30 | 26 | 21 | 14 | 7 | 3 | 3 | no fueling | no fueling |
| 25 | 22 | 18 | 12 | 5 | 3 | 3 | no fueling | no fueling |
| 20 | 20 | 16 | 10 | 4 | 3 | 3 | no fueling | no fueling |
| 15 | 17 | 14 | 8 | 3 | 3 | 3 | no fueling | no fueling |
| 10 | 16 | 12 | 7 | 3 | 3 | 3 | no fueling | no fueling |
| 0 | 13 | 10 | 5 | 3 | 3 | 3 | no fueling | no fueling |
| -10 | 11 | 8 | 3 | 3 | 3 | 3 | no fueling | no fueling |
| -20 | 9 | 6 | 3 | 3 | 3 | 3 | no fueling | no fueling |
| -30 | 8 | 5 | 3 | 3 | 3 | no fueling | no fueling | no fueling |
| -40 | 7 | 4 | 3 | 3 | 3 | no fueling | no fueling | no fueling |
| -50 | 6 | 4 | 3 | 3 | 3 | no fueling | no fueling | no fueling |
| -60 | 6 | 3 | 3 | 3 | 3 | no fueling | no fueling | no fueling |
| -70 | 5 | 3 | 3 | 3 | 3 | no fueling | no fueling | no fueling |
| -80 | 4 | 3 | 3 | 3 | 3 | no fueling | no fueling | no fueling |
| -90 | 4 | 3 | 3 | 3 | 3 | no fueling | no fueling | no fueling |

GAS CHARGING APPARATUS AND GAS CHARGING METHOD

CROSS-REFERENCE TO RELATED APPLICATIONS

This application is a national phase application of International Application No. PCT/JP2010/061147, filed Jun. 30, 2010, and claims the priority of International Application No. PCT/JP2009/006128, filed Nov. 16, 2009, the contents of both of which are incorporated herein by reference.

TECHNICAL FIELD

The present invention relates to a gas charging apparatus which is connected to a gas storage container of a fuel-supplied unit, so that a fuel gas supplied from a fuel gas supply source is charged into the gas storage container, and it also relates to a gas charging method.

BACKGROUND ART

Heretofore, there has been developed a fuel cell car on which a fuel cell to generate a power by an electrochemical reaction of a fuel gas (e.g., a hydrogen gas or a compressed natural gas) and an oxidizing gas (e.g., air) is mounted as an energy source. On this fuel cell car, a fuel gas tank (a gas storage container) is mounted, and the fuel gas is supplied to this fuel gas tank from a fuel gas supply system such as a gas charging apparatus (a fuel gas station). In this gas charging apparatus, a charging nozzle connected to an accumulator which stores the compressed fuel gas is usually connected to the fuel gas tank of the fuel cell car, to charge the high-pressure fuel gas into the fuel gas tank. However, when the fuel cell car includes a plurality of fuel gas tanks, a pressure and a temperature in one of the fuel gas tanks are monitored, and from this monitoring result, a fill percentage of the fuel gas tank is judged, to control the end of the charging of the fuel gas.

Moreover, there is also disclosed a gas charging apparatus comprising charging valves connected to a plurality of fuel gas tanks mounted on a fuel cell car, respectively; discharge valves connected to the plurality of fuel gas tanks, respectively; a charging piping line interposed between the charging valves; a discharge piping line interposed between the discharge valves; a plurality of temperature sensors which detect temperatures of the plurality of fuel gas tanks, respectively; a plurality of pressure sensors which detect pressures of the plurality of fuel gas tanks, respectively; and a control unit which controls the charging valves and the discharge valves based on the detection results of the temperature sensors and the pressure sensors (e.g., see JP-A-2004-84808)

SUMMARY OF THE INVENTION

Problems to be Solved by the Invention

Meanwhile, it has been desired that when a fuel gas is charged into a fuel gas tank, a fill percentage is 100%, and the gas is charged for a time which is as short as possible, and it has been known that for this purpose, it is optimum to control the charging so that in the fuel gas tank, a pressure is 87.5 MPa and a temperature is 85° C. It is to be noted that at present, durability and the like of the fuel gas tank are taken into consideration to determine an upper limit value of the temperature in the fuel gas tank during the charging of the fuel gas, and the predetermined value is usually about 85° C. Usually, if the temperature in the fuel gas tank exceeds 85° C., the charging of the fuel gas is stopped.

Moreover, in a fuel cell car on which a plurality of fuel gas tanks are mounted, a difference in physique among the fuel gas tanks or the like makes a difference in heat release properties among the fuel gas tanks (the heat release properties=the surface area of the tank/an internal volume of the tank). In one fuel cell car, there may be present in a mixed manner the fuel gas tanks where the temperature easily rises (the heat release properties are low) and the fuel gas tanks where the temperature does not easily rise (the heat release properties are high).

Here, when the fuel gas tanks having different heat release properties are present in the mixed manner, the pressure and the temperature in the fuel gas tank having the temperature which does not easily rise among the plurality of fuel gas tanks are monitored, and from this monitoring result, the fill percentage of the fuel gas tank is judged to control the end of the charging of the fuel gas. In this case, the pressure in the fuel gas tank is 87.5 MPa, the temperature is 85° C. and the fill percentage is 100%. Then, the fuel gas tank having the temperature which easily rises already has an internal temperature which exceeds 85° C. If the temperature in the fuel gas tank exceeds 85° C., the charging of the fuel gas is stopped. Therefore, the charging of the fuel gas is stopped before the fill percentage becomes 100%. On the other hand, when the pressure and the temperature in the fuel gas tank having the temperature which easily rises among the plurality of fuel gas tanks are monitored, the pressure in this fuel gas tank is 87.5 MPa, the temperature is 85° C. and the fill percentage is 100%. Then, in the fuel gas tank having the temperature which does not easily rise, an internal temperature does not rise up to 85° C., and the fill percentage exceeds 100%. Therefore, when the fuel cell car includes a plurality of fuel gas tanks, in a method of monitoring the pressure and temperature in any one of the fuel gas tanks and judging the fill percentage of the fuel gas tank from this monitoring result to control the end of the charging of the fuel gas, it is difficult to sufficiently charge the fuel gas into all the fuel tanks.

Moreover, the gas charging apparatus disclosed in JP-A-2004-84808 employs a method of disposing temperature sensors and pressure sensors in all fuel gas tanks, monitoring temperatures and pressures in all the fuel gas tanks, first transferring a gas to the fuel gas tank containing a small amount of a fuel gas (hydrogen) from another fuel gas tank containing a large amount of the fuel gas, which requires much cost and complicated control.

The present invention has been developed in view of such situations, and an object thereof is to provide a gas charging apparatus in which even when a fuel gas is charged into a plurality of gas storage containers including, in a mixed manner, gas storage containers where a temperature easily rises (heat release properties are low) and gas storage containers where a temperature does not easily rise (heat release properties are high), a fuel gas can be charged into the gas storage containers at a high fill percentage, respectively, and to provide a gas charging method.

Means for Solving the Problems

To achieve this object, there is provided a gas charging apparatus which is connected to a plurality of gas storage containers mounted on a fuel-supplied unit, to charge a fuel gas into the gas storage containers, respectively, the apparatus comprising: a gas supply source which supplies a compressed fuel gas; a fuel gas charging line which is connected to the gas supply source, to charge the fuel gas into the gas storage containers, respectively; a temperature information acquiring section which acquires temperature information in the gas storage containers; a pressure information acquiring section which acquires pressure information in the gas storage containers; a relation data acquiring section which acquires correspondence relation data indicating a correspondence relation between a temperature and a pressure in the gas storage container, in a case where a beforehand acquired of the gas storage container becomes a target fill percentage; a temperature difference calculating section which calculates, in accordance with the temperature information, a temperature difference between the gas storage container having the highest internal temperature and the gas storage container having the lowest internal temperature among the plurality of gas storage containers; and a control section which performs control so as to stop the charging of the fuel gas, when the temperature in the gas storage container having the lowest internal temperature becomes a balance temperature obtained by subtracting the temperature difference from a preset temperature upper limit value, and the pressure obtained from the temperature information becomes a corresponding pressure corresponding to the balance temperature in the correspondence relation data.

The gas charging apparatus having this constitution can perform control so that even when the fuel gas is charged into a plurality of gas storage containers including, in a mixed manner, the gas storage containers where a temperature easily rises and the gas storage containers where a temperature does not easily rise, the internal temperature of the gas storage container where the temperature most easily rises does not exceed a predetermined upper limit temperature, and the fill percentage of the fuel gas into the gas storage container where the temperature does not easily rise does not exceed 100%. Therefore, the fuel gas can efficiently be charged into the gas storage containers at a high fill percentage, respectively.

Moreover, the gas charging apparatus according to the present invention further comprises a temperature judging section which judges whether or not the temperature obtained from the temperature information becomes the balance temperature obtained by subtracting the temperature difference from the preset temperature upper limit value; and a pressure judging section which judges whether or not the pressure obtained from the pressure information becomes the corresponding pressure corresponding to the balance temperature in the correspondence relation data.

Furthermore, a configuration of the gas charging apparatus according to the present invention can have a constitution in which the temperature information acquiring section acquires the temperature information in the gas storage container having the highest heat release properties among the plurality of gas storage containers, the pressure information acquiring section acquires the pressure information in at least the gas storage container having the highest heat release properties among the plurality of gas storage containers, and the temperature difference calculating section calculates the temperature difference between the gas storage container having the highest heat release properties and the gas storage container having the lowest heat release properties during the charging of the fuel gas based on beforehand acquired heat release property data of the gas storage containers, respectively. According to such a constitution, even when the plurality of gas storage containers have different heat release properties, there are acquired the pressure information and the temperature information in one gas storage container, i.e., the gas storage container having the highest heat release properties among the plurality of gas storage containers, whereby the fuel gas can be charged into the gas storage containers at a high fill percentage, respectively.

Additionally, in the case of this constitution, the temperature information acquiring section can acquire the temperature information from a temperature detector beforehand disposed in the gas storage container having the highest heat release properties. According to such a constitution, when the fuel gas is charged, a detected temperature detected by the temperature detector is monitored, whereby the heat release properties of the respective gas storage containers are not compared, but the temperature in the gas storage container having the highest heat release properties can be detected.

Moreover, in another configuration of the gas charging apparatus according to the present invention, the temperature information acquiring section can acquire the temperature information in all the gas storage containers. According to such a constitution, since internal temperature information in all the gas storage containers can be acquired, it is possible to more easily and rapidly calculate the temperature difference between the gas storage container having the highest internal temperature and the gas storage container having the lowest internal temperature, whereby the fuel gas can be charged into the gas storage containers at a high fill percentage, respectively.

Furthermore, in the case of this constitution, the temperature information acquiring section can acquire the temperature information from temperature detectors beforehand disposed in all the gas storage containers, respectively.

Moreover, the gas charging apparatus according to the present invention can further comprise a charging flow rate data acquiring section which acquires data indicating a charging flow rate of the fuel gas determined by the temperature obtained from the temperature information and the pressure obtained from the pressure information. According to such a constitution, the fuel gas can be charged into the gas storage containers constantly at an appropriate charging flow rate (a pressure rise speed) in accordance with the temperatures and the pressures in the gas storage containers, respectively.

It is to be noted that in consideration of durability of the gas storage container and the like, the temperature upper limit value can be set to about 85° C. which is determined as the upper limit value of the temperature in the gas storage container during the charging of the fuel gas.

Moreover, the pressure information acquiring section acquires the pressure information from a pressure detector disposed at a downstream end of the fuel gas charging line. According to such a constitution, any pressure detector is not disposed in the gas storage container, but the pressure information in the gas storage container can be acquired.

Furthermore, according to the present invention, there is provided a gas charging method of a gas charging apparatus connected to a plurality of gas storage containers mounted on a fuel-supplied unit, to charge a fuel gas into the gas storage containers, respectively, the method comprising: a charging step of charging the fuel gas into the gas storage containers, respectively, from a gas supply source which supplies a compressed fuel gas via a fuel gas charging line; a temperature information acquiring step of acquiring temperature information in the gas storage containers; a pressure information acquiring step of acquiring pressure information in the gas storage containers; a relation data acquiring step of acquiring correspondence relation data indicating a correspondence relation between a temperature and a pressure in the gas storage container, in a case where a beforehand acquired fill percentage of the gas storage container becomes a target fill percentage; a temperature difference calculating step of calculating, in accordance with the temperature information, a temperature difference between the gas storage container having the highest internal temperature and the gas storage container having the lowest internal temperature among the plurality of gas storage containers; and a control step of performing control so as to stop the charging of the fuel gas, when the temperature of the gas storage container having the lowest internal temperature becomes a balance temperature obtained by subtracting the temperature difference from a preset temperature upper limit value, and the pressure obtained from the pressure information becomes a corresponding pressure corresponding to the balance temperature in the correspondence relation data.

The gas charging method comprising these steps can perform control so that even when the fuel gas is charged into a plurality of gas storage containers including, in a mixed manner, the gas storage containers where a temperature easily rises and the gas storage containers where a temperature does not easily rise, the internal temperature of the gas storage container where the temperature most easily rises does not exceed a predetermined upper limit temperature and the fuel gas fill percentage of the gas storage container where the temperature does not easily rise does not exceed 100%. Therefore, the fuel gas can efficiently be charged into the gas storage containers at a high fill percentage, respectively.

Moreover, the gas charging method according to the present invention further comprises a temperature judging step of judging whether or not the temperature obtained from the temperature information becomes the balance temperature obtained by subtracting the temperature difference from the preset temperature upper limit value; and a pressure judging step of judging whether or not the pressure obtained from the pressure information becomes the corresponding pressure corresponding to the balance temperature in the correspondence relation data.

Furthermore, in a configuration of the gas charging method according to the present invention, the temperature information acquiring step can include a step of acquiring the temperature information in the gas storage container having the highest heat release properties among the plurality of gas storage containers, the pressure information acquiring step can include a step of acquiring the pressure information in at least the gas storage container having the highest heat release properties among the plurality of gas storage containers, and the temperature difference calculating step can include a step of calculating the temperature difference between the gas storage container having the highest heat release properties and the gas storage container having the lowest heat release properties during the charging of the fuel gas based on beforehand acquired heat release property data of the respective gas storage containers.

According to this gas charging method, even when the plurality of gas storage containers have different heat release properties, there are acquired the pressure information and the temperature information in one gas storage container, i.e., the gas storage container having the highest heat release properties among the plurality of gas storage containers, whereby the fuel gas can be charged into the gas storage containers at a high fill percentage, respectively.

Additionally, the temperature information acquiring step can include a step of acquiring the temperature information from a temperature detector disposed in the gas storage container having the highest heat release properties. According to this step, the heat release properties of the respective gas storage containers are not compared, but the temperature information in the gas storage container having the highest heat release properties can be acquired.

Moreover, in another configuration of the gas charging method according to the present invention, the temperature information acquiring step can include a step of acquiring the temperature information in all the gas storage containers.

According to this gas charging method, since internal temperature information in all the gas storage containers can be acquired, it is possible to more easily and rapidly calculate the temperature difference between the gas storage container having the highest internal temperature and the gas storage container having the lowest internal temperature, whereby the fuel gas can be charged into the gas storage containers at a high fill percentage, respectively.

Furthermore, the temperature information acquiring step can include a step of acquiring the temperature information from the temperature detectors beforehand disposed in all the gas storage containers, respectively.

It is to be noted that in the gas charging method according to the present invention, durability of the gas storage container and the like are taken into consideration, whereby the temperature upper limit value can be set to about 85° C. which is determined as the upper limit value of the temperature in the gas storage container during the charging of the fuel gas.

Moreover, the pressure information acquiring step can include a step of acquiring the pressure information from a pressure detector disposed at a downstream end of the fuel gas charging line. According to this step, any pressure detector is not disposed in the gas storage container, but the pressure in the gas storage container can be detected.

Effect of the Invention

According to a gas charging apparatus of the present invention, even when a fuel gas is charged into a plurality of gas storage containers including, in a mixed manner, gas storage containers where a temperature easily rises and gas storage containers where a temperature does not easily rise, the fuel gas can efficiently be charged into the gas storage containers at a high fill percentage, respectively.

Moreover, according to a gas charging method of the present invention, even when the fuel gas is charged into the plurality of gas storage containers including, in a mixed manner, the gas storage containers where a temperature easily rises and the gas storage containers where a temperature does not easily rise, the fuel gas can efficiently be charged into the gas storage containers at the high fill percentage, respectively.

BRIEF DESCRIPTION OF THE DRAWINGS

FIG. 5 is a table showing the fill percentage of the gas tank in accordance with the relation between the temperature and the pressure in the gas tank (the gas storage container) according to Embodiment 1 of the present invention;

FIG. 8 is a table showing a charging flow rate (a pressure rise speed) of a fuel gas determined by a temperature and a pressure in a gas tank (a gas storage container) according to Embodiment 2 of the present invention;

MODE FOR CARRYING OUT THE INVENTION

Next, a gas charging apparatus and a gas charging method according to embodiments of the present invention will be described with reference to the drawings. It is to be noted that the embodiments described hereinafter are illustrations to describe the present invention, and the present invention is not limited only to these embodiments. Therefore, the present invention can be carried out in various configurations without departing from the scope.

Embodiment 1

Figure 1:
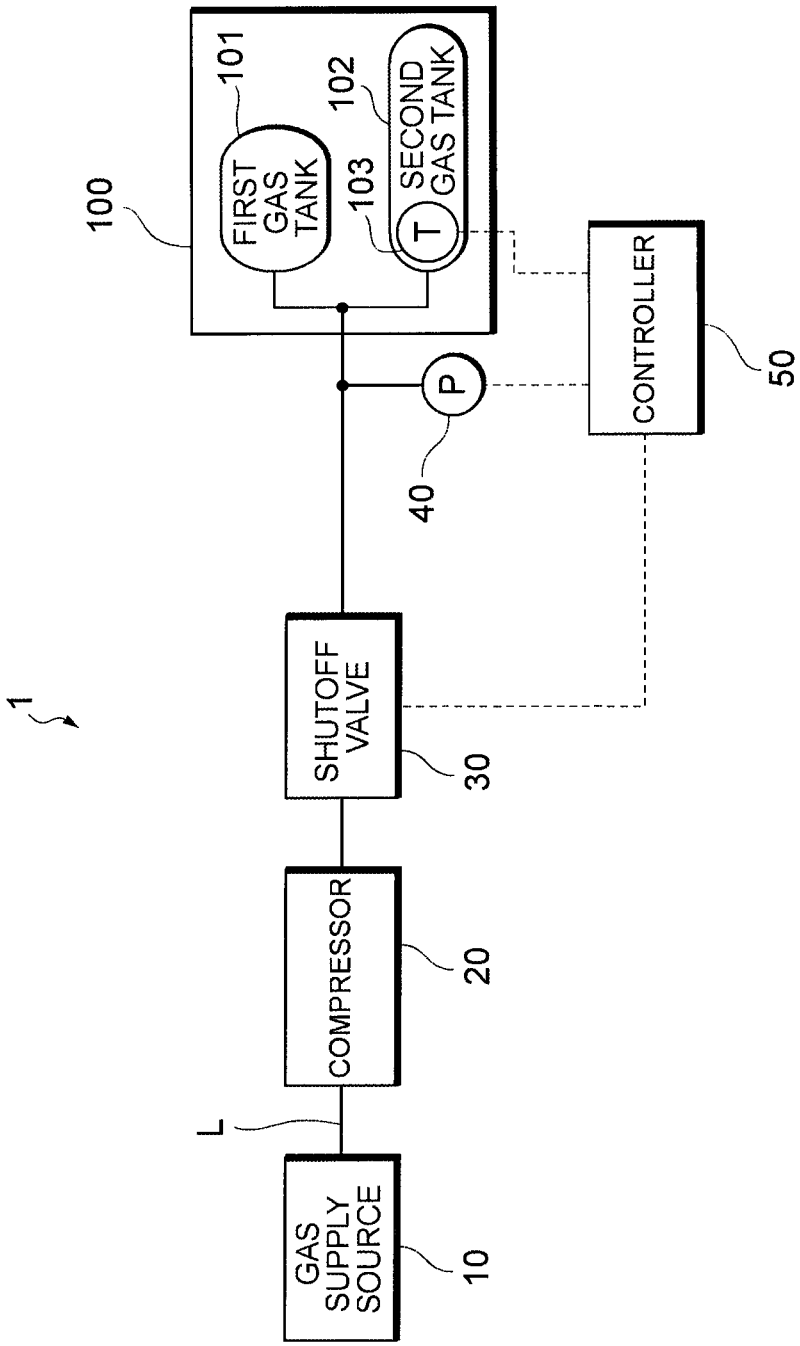
FIG. 1 is an exemplary diagram showing a constitution of a gas charging apparatus according to Embodiment 1 of the present invention.
Figure 2:
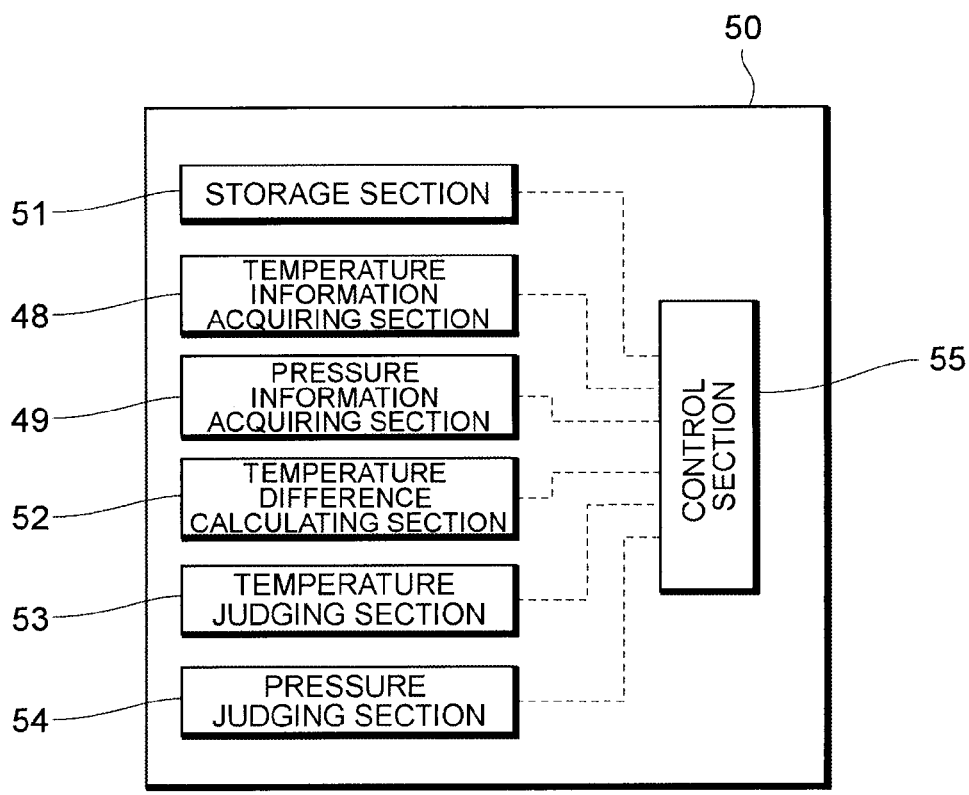
FIG. 2 is a block diagram showing a constitution of a controller which is a constituent element of the gas charging apparatus shown in FIG. 1.

FIG. 1 is an exemplary diagram showing a constitution of a gas charging apparatus according to Embodiment 1 of the present invention, and FIG. 2 is a block diagram showing a constitution of a controller which is a constituent element of the gas charging apparatus shown in FIG. 1. It is to be noted that in Embodiment 1, there will be described a case where a fuel-supplied unit is a fuel cell car (hereinafter referred to as an FC vehicle 100) on which a fuel cell to generate a power by an electrochemical reaction between a fuel gas (e.g., a hydrogen gas, a compressed natural gas or the like) and an oxidizing gas (e.g., air) is mounted as an energy source.

As shown in FIG. 1, the FC vehicle 100 comprises a plurality of gas tanks in which the fuel gas is stored (a first gas tank 101 and a second gas tank 102 in Embodiment 1). As to the first gas tank 101 and the second gas tank 102, data of heat release properties of the tanks is beforehand acquired in a manufacturing stage of the FC vehicle 100, and this data is stored in a storage section (not shown) mounted on the FC vehicle 100. It is to be noted that the second gas tank 102 has higher heat release properties than the first gas tank 101, and has a characteristic that a temperature does not easily rise, and in the second gas tank 102, a thermometer 103 is beforehand disposed as a temperature detector which measures a temperature (T) in the second gas tank 102. The thermometer 103 can transmit, by communication, a detected temperature (T) as temperature information to a temperature information acquiring section 48 of a gas charging apparatus 1 described later in detail.

As shown in FIG. 1, the gas charging apparatus 1 is an apparatus which charges the fuel gas into the first gas tank 101 and the second gas tank 102 mounted on the FC vehicle 100, and the apparatus includes a gas supply source 10 which supplies the fuel gas, and a fuel gas charging line L which is connected to the gas supply source 10, so that the fuel gas supplied from the gas supply source 10 is charged into the first gas tank 101 and the second gas tank 102. Along the fuel gas charging line L, in order from a gas supply source 10 side, there are arranged a compressor 20 which compresses the fuel gas supplied from the gas supply source 10, a shutoff valve 30 which can stop circulation of the fuel gas discharged from the compressor 20, and a pressure gauge 40 as a pressure detector which measures the pressure of the fuel gas which circulates through the fuel gas charging line L. The pressure gauge 40 can transmit, by communication, a detected pressure (P) as pressure information to a pressure information acquiring section 49 of the gas charging apparatus 1 described later in detail.

Moreover, the gas charging apparatus 1 comprises a controller 50 which is connected to the thermometer 103, the pressure gauge 40 and the shutoff valve 30 to control opening/closing of the shutoff valve 30 based on the temperature information (the temperature: T) transmitted from the thermometer 103 and the pressure information (the pressure: P) transmitted from the pressure gauge 40.

As shown especially in FIG. 2, the controller 50 comprises the temperature information acquiring section 48 which acquires the temperature measured with the thermometer 103 (T: the temperature information); the pressure information acquiring section 49 which acquires the pressure measured with the pressure gauge 40 (P: the pressure information); a storage section 51 in which there is stored correspondence relation data (see FIG. 3) indicating a correspondence relation between the temperature and the pressure in the corresponding gas tank in a case where a beforehand acquired fill percentage of the gas tank (the gas storage container) becomes a target fill percentage (about 100%); a temperature difference calculating section 52 which calculates a temperature difference ($\Delta T$) between the gas tank having the highest heat release properties (the second gas tank 102 in Embodiment 1) and the gas tank having the lowest heat release properties (the first gas tank 101 in Embodiment 1) based on beforehand acquired heat release property data of the first gas tank 101 and the second gas tank 102; a temperature judging section 53 which judges whether or not the temperature acquired by the temperature information acquiring section 48 becomes a balance temperature obtained by subtracting the temperature difference ($\Delta T$) from a preset temperature upper limit value (85° C. in Embodiment 1); a pressure judging section 54 which judges whether or not the pressure acquired by the pressure information acquiring section 49 becomes a corresponding pressure corresponding to the balance temperature in the correspondence relation data; and a control section 55 which performs control so as to close the shutoff valve 30, when the temperature acquired by the temperature information acquiring section 48 becomes the balance temperature and the detected pressure becomes the corresponding pressure.

It is to be noted that at a downstream end of the fuel gas charging line L, a charging nozzle (not shown) is disposed. When this charging nozzle is connected to a fuel supply port of the FC vehicle 100, there is obtained a state where the charging of the fuel gas can start.

Figure 4:
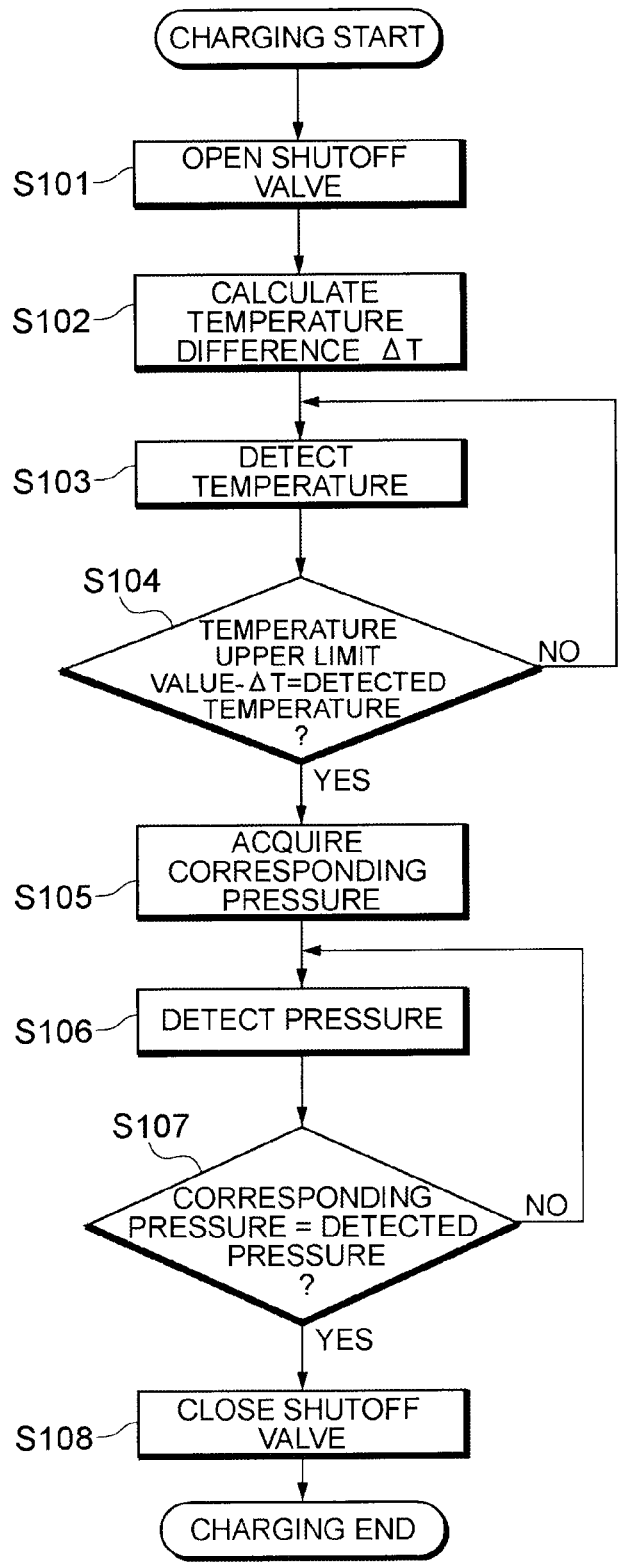
FIG. 4 is a flowchart showing a gas charging method according to Embodiment 1 of the present invention.

Next, a specific operation (i.e., a gas charging method) of the gas charging apparatus 1 according to Embodiment 1 will be described with reference to a flowchart shown in FIG. 4.

When the fuel gas is charged into the FC vehicle 100, the charging nozzle (not shown) of the gas charging apparatus 1 is first connected to the fuel supply port (not shown) of the FC vehicle 100, thereby obtaining the state where the charging of the fuel gas can start. At this time, the shutoff valve 30 closes. Next, the operation advances to step S101 to open the shutoff valve 30 (obtain an open state). Through this operation, the fuel gas supplied from the gas supply source 10 flows through the compressor 20 via the fuel gas charging line L, and the fuel gas discharged from the compressor 20 is charged into the first gas tank 101 and the second gas tank 102 through the fuel gas charging line L on a downstream side via the shutoff valve 30. Afterward, the operation advances to step S102.

In the step S102, the temperature difference calculating section 52 acquires the heat release property data of the first gas tank 101 and the second gas tank 102 from a storage section (not shown) of the FC vehicle 100, and calculates the temperature difference ($\Delta T$) between the first gas tank 101 and the second gas tank 102 during the charging of the fuel gas based on this acquired data, thereby advancing to step S103. It is to be noted that in Embodiment 1, the temperature difference ($\Delta T$) between the first gas tank 101 and the second gas tank 102 is set to 10° C.

In the step S103, the thermometer 103 detects the temperature in the second gas tank 102, and the temperature information acquiring section 48 acquires this temperature information by communication, thereby advancing to step S104. Next, in the step S104, the temperature judging section 53 judges whether or not a balance temperature (75° C. in Embodiment 1) obtained by subtracting the temperature difference ($\Delta T$: 10° C. in Embodiment 1) between the first gas tank 101 and the second gas tank 102 from a temperature upper limit value (85° C.) in the gas tank matches the temperature acquired by the temperature information acquiring section 48. When the balance temperature (75° C.) matches the temperature acquired by the temperature information acquiring section 48 (the step S104: YES), the operation advances to step S105. On the other hand, when the balance temperature (75° C.) does not match the temperature acquired by the temperature information acquiring section 48 (the step S104: NO), the operation returns to the step S103.

Figure 3:
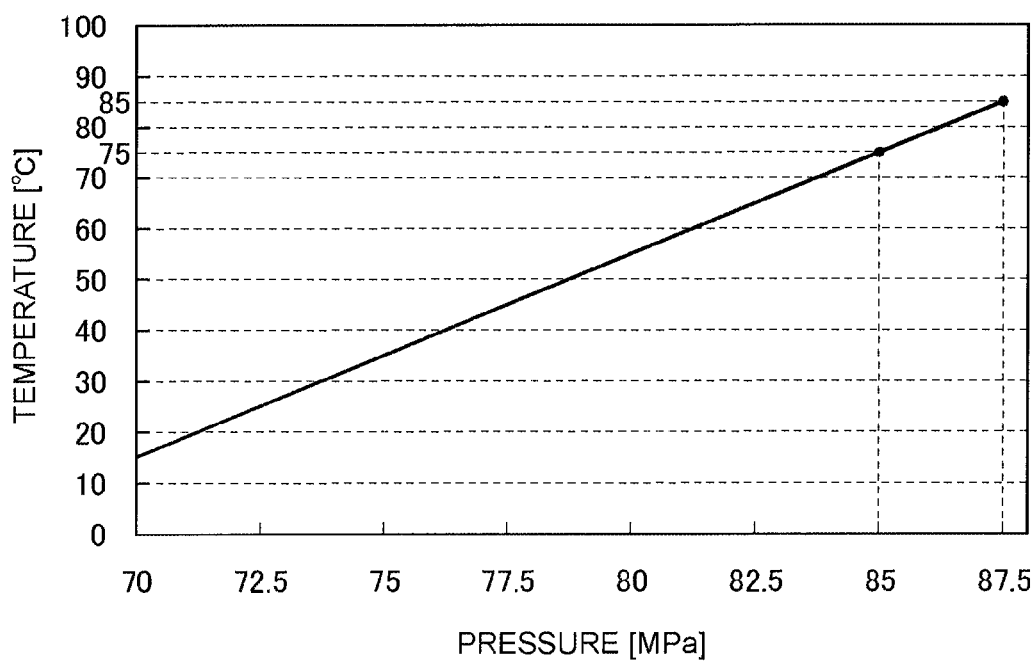
FIG. 3 is a diagram showing a correspondence relation between a temperature and a pressure in a gas tank, in a case where a fill percentage of the gas tank (a gas storage container) becomes a target fill percentage in the gas charging apparatus according to Embodiment 1 of the present invention.

In the step S105, the pressure judging section 54 acquires, from a correspondence relation between a temperature and a pressure stored in the storage section 51 as shown in FIG. 3, a pressure (the corresponding pressure) in the gas tank at a temperature of 75° C. in the gas tank, thereby advancing to step S106. It is to be noted that as shown in FIG. 3, in Embodiment 1, the corresponding pressure at the temperature of 75° C. in the gas tank is 85 MPa. That is, as to the second gas tank 102, when the temperature is 75° C. and the pressure is 85 MPa in the second gas tank 102, the fill percentage of the fuel gas becomes about 100% as shown in FIG. 5. Moreover, in Embodiment 1, the pressure judging section 54 performs a function of a relation data acquiring section which acquires correspondence relation data.

In the step S106, the pressure gauge 40 detects the pressure of the fuel gas which circulates through the vicinity of the downstream end of the fuel gas charging line L, and transmits this pressure information to the pressure information acquiring section 49, thereby advancing to step S107. Next, in the step S107, the pressure judging section 54 judges whether or not the corresponding pressure (85 MPa) matches the pressure acquired by the pressure information acquiring section 49. When the corresponding pressure matches the pressure acquired by the pressure information acquiring section 49 (the step S107: YES), the operation advances to step S108. On the other hand, when the corresponding pressure does not match the pressure acquired by the pressure information acquiring section 49 (the step S107: NO), the operation returns to the step S106.

In the step S108, the control section 55 closes the shutoff valve 30, and stops the charging of the fuel gas into the first gas tank 101 and the second gas tank 102.

It is to be noted that as described above, in Embodiment 1, the second gas tank 102 has higher heat release properties than the first gas tank 101, and has a characteristic that the temperature does not easily rise, and the temperature difference ($\Delta T$) between both the gas tanks during the charging of the fuel gas is 10° C. Therefore, when the temperature in the second gas tank 102 is 75° C., the temperature in the first gas tank 101 becomes 85° C. However, the pressure in the first gas tank 101 is 85 MPa which is the same as the pressure in the second gas tank 102, and hence the fill percentage of the fuel gas becomes about 98% as shown in FIG. 5.

Consequently, even in the FC vehicle 100 on which the first gas tank 101 and the second gas tank 102 having different heat release properties are mounted, when the temperature and the pressure in the second gas tank 102 having the highest heat release properties are simply monitored, the fill percentage of the fuel gas into both the gas tanks 101 and 102 can substantially be increased close to 100%.

Moreover, as described above, at present, the upper limit value (about 85° C.) of the temperature in the gas tank during the charging of the fuel gas has been determined in consideration of the durability of the gas tank or the like. Also in Embodiment 1, if the temperature in the first gas tank 101 and the temperature in the second gas tank 102 exceed 85° C., the charging of the fuel gas is stopped. Specifically, in Embodiment 1, the problem is solved by raising a flag to close the shutoff valve 30, when the balance temperature obtained by subtracting the temperature difference ($\Delta T$) from the temperature upper limit value (85° C.) matches the temperature acquired by the temperature information acquiring section 48.

It is to be noted that in Embodiment 1, there has been described a case where the fuel gas is charged into the FC vehicle 100 on which two gas tanks having different heat release properties (the first gas tank 101 and the second gas tank 102) are mounted, but the present invention is not limited to this example. According to the gas charging apparatus and gas charging method of the present invention, the fuel gas can be charged into the FC vehicle 100 on which three or more gas tanks are mounted. In this case, the temperature of the gas tank where the heat release properties are highest (a temperature has the most difficulty in rising) among three or more gas tanks is detected, and a temperature difference ($\Delta T$) between the above gas tank and the gas tank where the heat release properties are lowest (a temperature most easily rises) may be calculated.

Moreover, in Embodiment 1, there has been described the case where the thermometer 103 beforehand disposed in the gas tank having the highest heat release properties (the second gas tank 102) detects the temperature in the gas tank having the highest heat release properties and this detected temperature is transmitted to the temperature information acquiring section 48. Therefore, for example, heat release property data of the respective gas tanks is not compared, but the temperature information in the gas tank having the highest heat release properties can be acquired, and a temperature information acquiring step can easily be performed. However, the present invention is not limited to this example. The temperature in the gas tank having the highest heat release properties is detected by, for example, selecting the gas tank having the highest heat release properties at the start of the charging of the fuel gas based on the heat release property data stored in the storage section of the FC vehicle 100 and inserting the temperature detector into the selected gas tank during the charging of the gas to detect the temperature. The temperature may be detected by such an arbitrary method. Also in this case, the temperature information acquiring section 48 can acquire the temperature information in the gas tank from the inserted temperature detector.

Furthermore, in Embodiment 1, there has been described the case where the pressure gauge 40 is disposed in the vicinity of the downstream end of the fuel gas charging line L, and the pressure gauge 40 detects the pressure of the fuel gas which circulates through the vicinity of the downstream end of the fuel gas charging line L to detect the pressures in the first gas tank 101 and the second gas tank 102, thereby transmitting this detected pressure to the pressure information acquiring section 49. Therefore, it is possible to obtain an advantage that any pressure detector does not beforehand have to be disposed in the first gas tank 101 and the second gas tank 102, but the present invention is not limited to this example. At least the pressure in the gas tank having the highest heat release properties may be detected by selecting the gas tank having the highest heat release properties at the start of the charging of the fuel gas based on the heat release property data stored in the storage section (not shown) mounted on the FC vehicle 100 and inserting the pressure detector into the selected gas tank to detect the pressure, or the pressure is detected with the pressure detector beforehand disposed in the gas tank. The pressure may be detected by such an arbitrary method. Also in this case, the pressure information acquiring section 49 can acquire the pressure information from the inserted pressure detector.

Additionally, in Embodiment 1, there has been described the case where after performing the steps S103 and S104, the steps S105 to S107 are performed, but the present invention is not limited to this example. In the present invention, for example, the step S103 and the step S104 may be performed after performing the steps S105 to S107, or the step S103 and the step S104 are performed in parallel with (simultaneously with) the steps S105 to S107, whereby when the temperature acquired by the temperature information acquiring section 48 becomes the balance temperature and the pressure acquired by the pressure information acquiring section 49 becomes the corresponding pressure, control may be performed so as to stop the charging of the fuel gas.

Embodiment 2

Next, a gas charging apparatus and a gas charging method according to Embodiment 2 of the present invention will be described with reference to the drawings.

Figure 6:
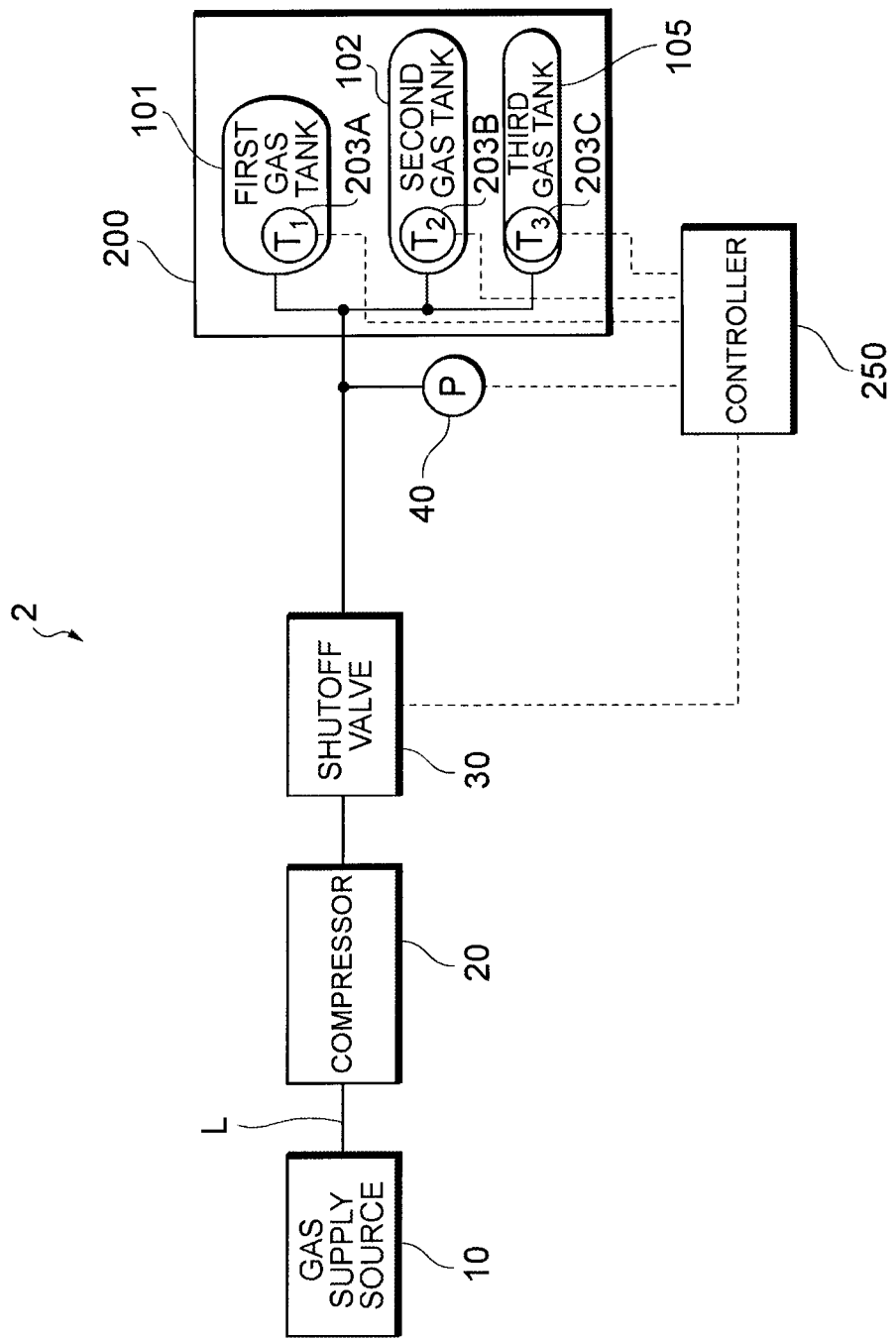
FIG. 6 is an exemplary diagram showing a constitution of a gas charging apparatus according to Embodiment 2 of the present invention.
Figure 7:
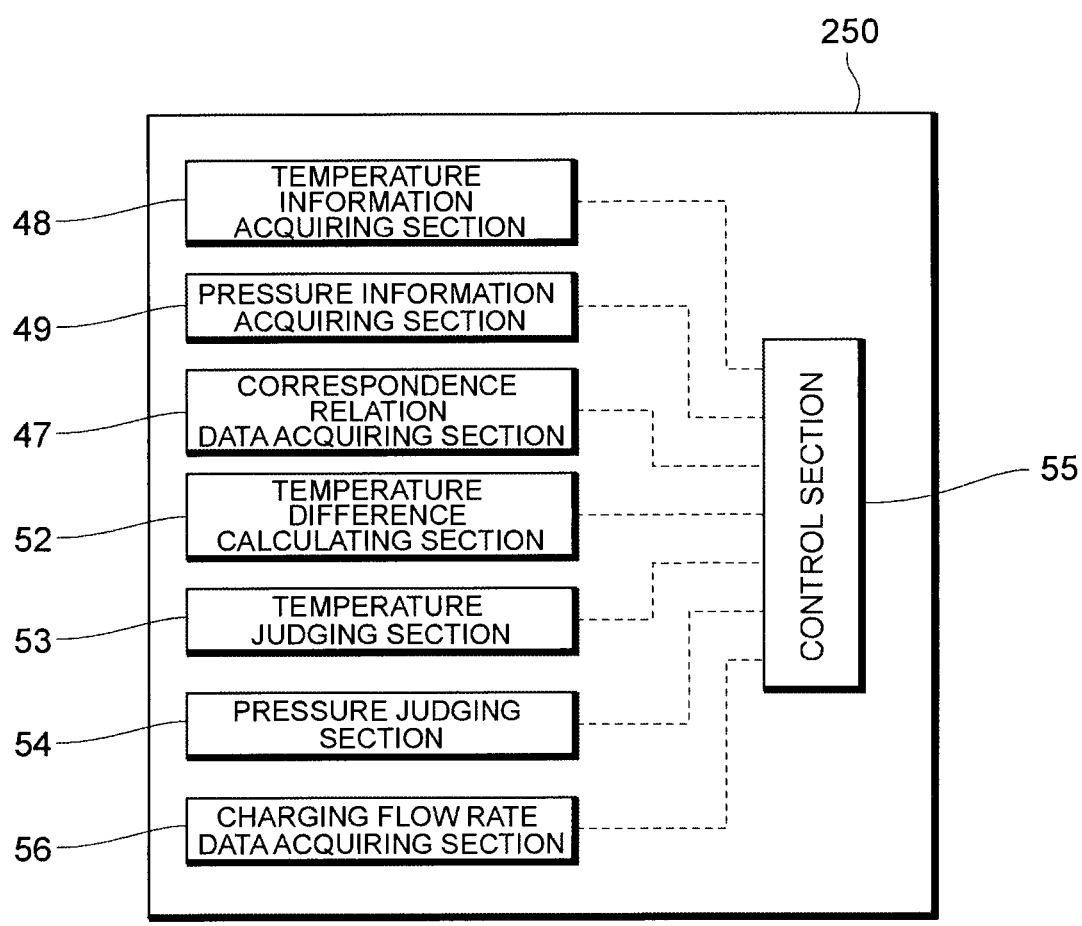
FIG. 7 is a block diagram showing a constitution of a controller which is a constituent element of the gas charging apparatus shown in FIG. 6.

FIG. 6 is an exemplary diagram showing a constitution of the gas charging apparatus according to Embodiment 2 of the present invention, and FIG. 7 is a block diagram showing a constitution of a controller which is a constituent element of the gas charging apparatus shown in FIG. 6. It is to be noted that in Embodiment 2, members similar to those of the gas charging apparatus described in Embodiment 1 are denoted with the same reference numerals, and detailed description thereof is omitted. Moreover, also in Embodiment 2, there will be described a case where a fuel-supplied unit is an FC vehicle in the same manner as in Embodiment 1.

As shown in FIG. 6, an FC vehicle 200 into which a gas charging apparatus 2 charges a fuel gas comprises a first gas tank 101, a second gas tank 102 and a third gas tank 105. In the first gas tank 101, a thermometer 203A is beforehand disposed as a temperature detector which detects a temperature ($T_1$) in the first gas tank 101; in the second gas tank 102, a thermometer 203B is beforehand disposed as a temperature detector which detects a temperature ($T_2$) in the second gas tank 102; and in the third gas tank 105, a thermometer 203C is beforehand disposed as a temperature detector which detects a temperature ($T_3$) in the second gas tank 105. The thermometers 203A, 203B and 203C can transmit, by communication, the detected temperatures ($T_1$, $T_2$ and $T_3$) as temperature information to the temperature information acquiring section 48 of the gas charging apparatus 2.

It is to be noted that in Embodiment 2, the second gas tank 102 has higher heat release properties than the first gas tank 101 and has a characteristic that a temperature does not easily rise, and the third gas tank 105 has higher heat release properties than the second gas tank 102 and has a characteristic that the temperature does not easily rise. That is, the temperatures of the three gas tanks lower in order of the first gas tank 101, the second gas tank 102 and the third gas tank 105 ($T_1 > T_2 > T_3$).

Figure 9:
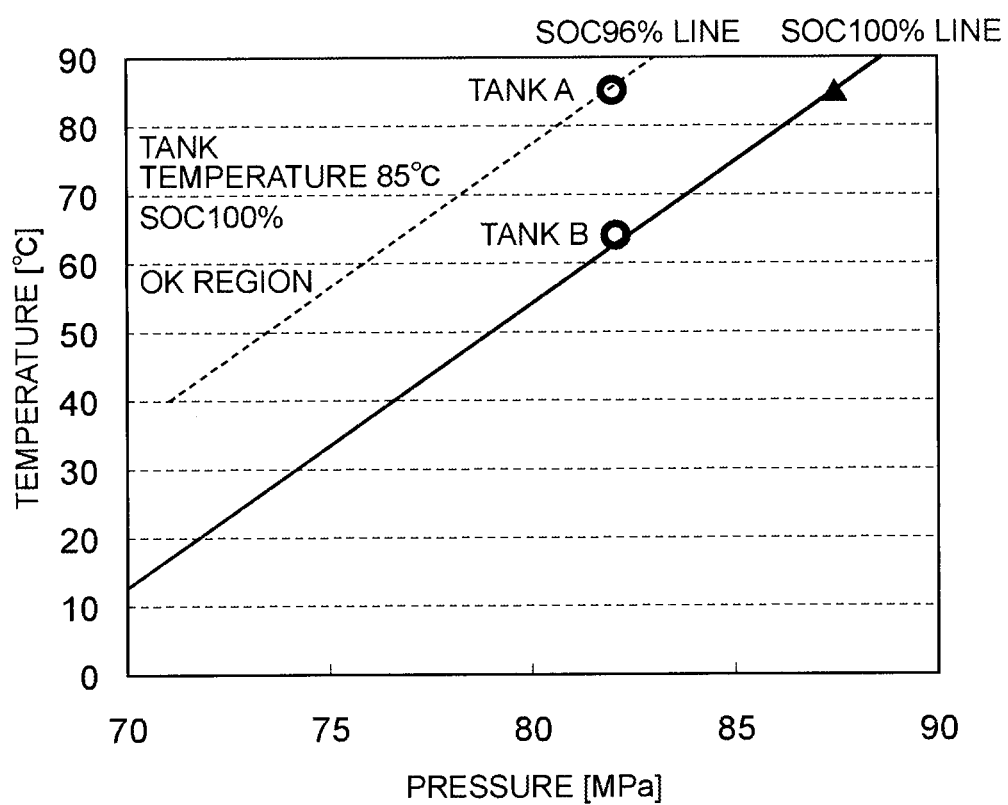
FIG. 9 is a diagram showing a correspondence relation between the temperature and the pressure in the gas tank, in a case where a fill percentage of the gas tank (the gas storage container) becomes a target fill percentage in the gas charging apparatus according to Embodiment 2 of the present invention.

Moreover, in a storage section (not shown) mounted on the FC vehicle 200, there are stored information indicating a charging flow rate (a temperature rise speed) of the fuel gas determined by the temperature and a pressure in the gas tank (see FIG. 8), and information indicating a correspondence relation between the temperature and the pressure in the gas tank in a case where a fill percentage into the gas tank becomes a target fill percentage (see FIG. 9). In the case of Embodiment 2, the correspondence relation between the temperature and the pressure in the gas tank in the case where the fill percentage into the gas tank becomes the target fill percentage is indicated by correspondence relation data shown in FIG. 9 in the same manner as in Embodiment 1.

As shown in FIG. 6, the gas charging apparatus 2 is an apparatus which charges the fuel gas into the first gas tank 101, the second gas tank 102 and the third gas tank 105 mounted on the FC vehicle 200, and includes a gas supply source 10 and a fuel gas charging line L in the same manner as in the gas charging apparatus 1 according to Embodiment 1. The fuel gas charging line L is provided with a compressor 20, a shutoff valve 30 and a pressure gauge 40. The pressure gauge 40 can transmit, by communication, the detected pressure (P) as pressure information to a pressure information acquiring section 49 of the gas charging apparatus 2.

Moreover, the gas charging apparatus 2 comprises a controller 250 which is connected to the thermometers 203A, 203B and 203C, the pressure gauge 40 and the shutoff valve 30 to control opening/closing of the shutoff valve 30 based on the temperature information (the temperatures: $T_1$, $T_2$ and $T_3$) transmitted from the thermometers 203A, 203B and 203C, the pressure information (the pressure: P) transmitted from the pressure gauge 40, and information acquired from the storage section (not shown) mounted on the FC vehicle 200.

As shown especially in FIG. 7, the controller 250 comprises a temperature information acquiring section 48 which acquires the temperatures measured with the thermometers 203A, 203B and 203C ($T_1$, $T_2$ and $T_3$: the temperature information); the pressure information acquiring section 49 which acquires the pressure measured with the pressure gauge 40 (P: the pressure information); a correspondence relation data acquiring section 47 which acquires, from the correspondence relation data stored in the storage section (not shown) mounted on the FC vehicle 200 (see FIG. 9), a pressure (P': a pressure target value) corresponding to a balance temperature ($T_{MAX} - \Delta T$) obtained by subtracting a temperature difference ($\Delta T$) from a temperature upper limit value ($T_{MAX}$); a temperature difference calculating section 52 which calculates the temperature difference ($\Delta T$) between the highest temperature ($T_1$) and the lowest temperature ($T_3$) from the temperatures ($T_1$, $T_2$ and $T_3$) acquired by the temperature information acquiring section 48; a temperature judging section 53 which judges whether or not the temperature acquired by the temperature information acquiring section 48 becomes a balance temperature obtained by subtracting the temperature difference ($\Delta T$) from the preset temperature upper limit value ($T_{MAX}$); a pressure judging section 54 which judges whether or not the pressure acquired by the pressure information acquiring section 49 becomes the pressure (P') corresponding to the balance temperature ($T_{MAX}-\Delta T$) in the correspondence relation data; a control section 55 which performs control so as to close the shutoff valve 30, when the temperature acquired by the temperature information acquiring section 48 becomes the balance temperature ($T_{MAX}-\Delta T$) and the pressure (P) measured with the pressure gauge 40 becomes the corresponding pressure (P'); and a charging flow rate data acquiring section 56 which acquires, from data indicating a charging flow rate of the fuel gas stored in the storage section (not shown) mounted on the FC vehicle 200, the charging flow rate of the fuel gas determined by the temperature ($T_3$) measured with the thermometer 203C and the pressure (P) measured with the pressure gauge 40.

It is to be noted that at a downstream end of the fuel gas charging line L, a charging nozzle (not shown) is disposed in the same manner as in Embodiment 1. When this charging nozzle is connected to a fuel supply port of the FC vehicle 100, there is obtained a state where the charging of the fuel gas can start. The charging nozzle and the fuel supply port have a communicating function, so that the above information can be transmitted and received.

Figure 10:
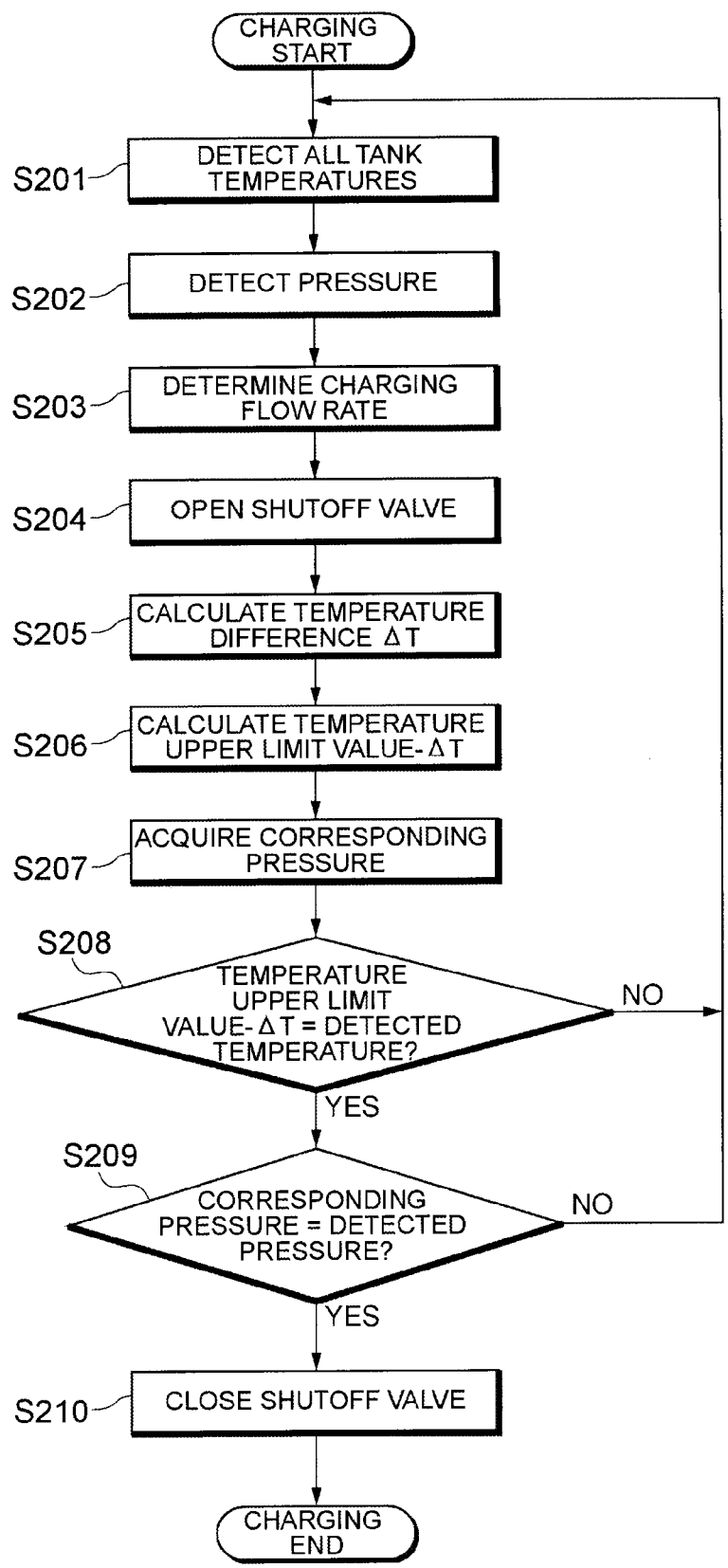
FIG. 10 is a flowchart showing a gas charging method according to Embodiment 2 of the present invention.

Next, a specific operation (i.e., a gas charging method) of the gas charging apparatus 2 according to Embodiment 2 will be described with reference to a flowchart shown in FIG. 10.

When the fuel gas is charged into the FC vehicle 200, the charging nozzle (not shown) of the gas charging apparatus 2 is first connected to the fuel supply port (not shown) of the FC vehicle 200, thereby obtaining the state where the charging of the fuel gas can start. At this time, the shutoff valve 30 closes. Next, the operation advances to step S201 in which the temperature information acquiring section 48 acquires, by communication, the temperatures ($T_1$, $T_2$ and $T_3$) measured with the thermometers 203A, 203B and 203C arranged in the first gas tank 101, the second gas tank 102 and the third gas tank 105 mounted on the FC vehicle 200, respectively, thereby advancing to step S202.

In the step S202, the pressure information acquiring section 49 acquires, by communication, the pressure (P) measured with the pressure gauge 40, thereby advancing to step S203.

In the step S203, the charging flow rate data acquiring section 56 acquires, from data indicating the charging flow rate of the fuel gas stored in the storage section (not shown) mounted on the FC vehicle 200 (see FIG. 8), the charging flow rate of the fuel gas determined by the temperature ($T_3$) measured with the thermometer 203C and the pressure (P) measured with the pressure gauge 40, thereby advancing to step S204.

The step S204 opens the shutoff valve 30 to charge the fuel gas into the first gas tank 101, the second gas tank 102 and the third gas tank 105 from the gas supply source 10 via the fuel gas charging line L, the compressor 20 and the shutoff valve 30 at the charging flow rate acquired in the step S203. Afterward, the operation advances to step S205.

Next, in the step S205, the temperature difference calculating section 52 calculates the temperature difference ($\Delta T$) between the highest temperature ($T_1$) and the lowest temperature ($T_3$) among the temperatures ($T_1$, $T_2$ and $T_3$) acquired by the temperature information acquiring section 48, thereby advancing to step S206.

The step S206 calculates the balance temperature ($T_{MAX}-\Delta T$) obtained by subtracting the temperature difference ($\Delta T$) calculated in the step S205 from the predetermined temperature upper limit value ($T_{MAX}$), thereby advancing to step S207.

Next, in the step S207, the correspondence relation data acquiring section 47 acquires the pressure (P') with an SoC of 100% at the balance temperature ($T_{MAX}-\Delta T$), from the correspondence relation data (see FIG. 9) stored in the storage section (not shown) mounted on the FC vehicle 200. Afterward, the operation advances to step S208.

In the step S208, the temperature judging section 53 judges whether or not the balance temperature ($T_{MAX}-\Delta T$) calculated in the step S206 matches the lowest temperature ($T_3$) acquired by the temperature information acquiring section 48. When the balance temperature ($T_{MAX}-\Delta T$) matches the temperature acquired by the temperature information acquiring section 48 (the step S208: YES), the operation advances to step S209. On the other hand, when the balance temperature ($T_{MAX}-\Delta T$) does not match the temperature acquired by the temperature information acquiring section 48 (the step S208: NO), the operation returns to the step S201.

In the step S209, the pressure judging section 54 judges whether or not the pressure (P') acquired in the step S207 matches the pressure (P) acquired by the pressure information acquiring section 49. When the pressure (P) acquired by the pressure information acquiring section 49 matches the pressure (P') acquired by the pressure information acquiring section 49 (the step S209: YES), the operation advances to step S210. On the other hand, when the pressure (P) does not match the pressure (P') (the step S209: NO), the operation returns to the step S201.

In step S210, the control section 55 closes the shutoff valve 30 to stop the charging of the fuel gas into the first gas tank 101, the second gas tank 102 and the third gas tank 105.

It is to be noted that in a case where a final temperature difference between the first gas tank 101 and the third gas tank 105 is, for example, 20° C., when the supply of the fuel gas is stopped as shown in FIG. 9, the first gas tank 101 has a temperature of 85° C., a pressure of 82 MPa and a fill percentage of 96%, and the third gas tank 105 has a temperature of 65° C., a pressure of 82 MPa and a fill percentage of 100%.

In this manner, even when a plurality of gas tanks having different heat release properties are mounted on the FC vehicle 200, the fill percentage of the fuel gas into all the gas tanks can be increased substantially close to 100%.

It is to be noted that also in Embodiment 2, the durability of the gas tank and the like are taken into consideration to stop the charging of the fuel gas in the same manner as in Embodiment 1, when the temperature in all the gas tanks exceeds the presently determined upper limit value (about 85° C.).

Moreover, in Embodiment 2, there has been described the case where the fuel gas is charged into the FC vehicle 200 on which three gas tanks having different heat release properties are mounted, but the present invention is not limited to this example. According to the gas charging apparatus and gas charging method of the present invention, the fuel gas can be charged into the FC vehicle 200 on which three or more gas tanks are mounted.

Furthermore, in Embodiment 2, there has been described a case where the thermometers are disposed in the gas tanks mounted on the FC vehicle 200, but the present invention is not limited to this example. When the gas charging apparatus 2 is provided with a thermometer (a temperature detector) to detect the temperature of each gas tank at the start of the charging of the fuel gas, this temperature information may be acquired by the temperature information acquiring section 48.

Moreover, in Embodiment 2, there has been described the case where in the storage section of the FC vehicle 200, there are stored the information (see FIG. 8) indicating the charging flow rate (the temperature rise speed) of the fuel gas determined by the temperature, and the pressure in the gas tank and the information (see FIG. 9) indicating the correspondence relation between the temperature and the pressure in the gas tank in a case where the fill percentage of the gas tank becomes the target fill percentage, but the present invention is not limited to this example. The gas charging apparatus 2 may include a storage section in which at least one piece of the above information is stored.

DESCRIPTION OF REFERENCE NUMERALS 1 and 2 . . . gas charging apparatus, 10 . . . gas supply source, 20 . . . compressor, 30 . . . shutoff valve, 40 . . . pressure gauge, 47 . . . correspondence relation data acquiring section, 48 . . . temperature information acquiring section, 49 . . . pressure information acquiring section, 50 . . . controller, 51 . . . storage section, 52 . . . temperature difference calculating section, 53 . . . temperature judging section, 54 . . . pressure judging section, 55 . . . control section, 56 . . . charging flow rate data acquiring section, 100 and 200 . . . FC vehicle, 101 . . . first gas tank, 102 . . . second gas tank, 103, 203A, 203B and 203C: thermometer, and 105 . . . third gas tank.

The invention claimed is:

1. A gas charging apparatus which is connected to a plurality of gas storage containers mounted on a fuel-supplied unit, to charge a fuel gas into the gas storage containers, respectively, the apparatus comprising:
 a gas supply source which supplies a compressed fuel gas;
 a fuel gas charging line which is connected to the gas supply source, to charge the fuel gas into the gas storage containers, respectively; and
 a controller, the controller including:
  a temperature information acquiring section which acquires temperature information in the gas storage containers;
  a pressure information acquiring section which acquires pressure information in the gas storage containers;
  a relation data acquiring section which acquires correspondence relation data indicating a correspondence relation between a temperature and a pressure in the gas storage container, in a case where a beforehand acquired fill percentage of the gas storage container becomes a target fill percentage;
  a temperature difference calculating section which calculates, in accordance with the temperature information, a temperature difference between the gas storage container having the highest internal temperature and the gas storage container having the lowest internal temperature among the plurality of gas storage containers; and
  a control section which performs control so as to stop the charging of the fuel gas, when the temperature in the gas storage container having the lowest internal temperature becomes a balance temperature obtained by subtracting the temperature difference from a preset temperature upper limit value, and the pressure obtained from the pressure information becomes a corresponding pressure corresponding to the balance temperature in the correspondence relation data.

2. The gas charging apparatus according to claim 1, wherein the controller further includes:
 a temperature judging section which judges whether or not the temperature obtained from the temperature information becomes the balance temperature obtained by subtracting the temperature difference from the preset temperature upper limit value; and
 a pressure judging section which judges whether or not the pressure obtained from the pressure information becomes the corresponding pressure corresponding to the balance temperature in the correspondence relation data,
 wherein the control section performs control so as to stop the charging of the fuel gas according to the results of the temperature judging section and the pressure judging section.

3. The gas charging apparatus according to claim 1, wherein the controller further includes:
 a charging flow rate data acquiring section which acquires data indicating a charging flow rate of the fuel gas determined by the temperature obtained from the temperature information and the pressure obtained from the pressure information after the temperature is obtained by the temperature information acquiring section and the pressure is obtained by the pressure information acquiring section.

4. The gas charging apparatus according to claim 1, wherein the preset temperature upper limit value is 85° C.

5. The gas charging apparatus according to claim 1, wherein the pressure information acquiring section acquires the pressure information from a pressure detector disposed at a downstream end of the fuel gas charging line.

6. A gas charging method of a gas charging apparatus connected to a plurality of gas storage containers mounted on a fuel-supplied unit, to charge a fuel gas into the gas storage containers, respectively, the method comprising:
 charging the fuel gas into the gas storage containers, respectively, from a gas supply source which supplies a compressed fuel gas via a fuel gas charging line;
 acquiring temperature information in the gas storage containers;
 acquiring pressure information in the gas storage containers;
 acquiring correspondence relation data indicating a correspondence relation between a temperature and a pressure in the gas storage container, in a case where a beforehand acquired fill percentage of the gas storage container becomes a target fill percentage;
 calculating, in accordance with the temperature information, a temperature difference between the gas storage container having the highest internal temperature and the gas storage container having the lowest internal temperature among the plurality of gas storage containers; and
 controlling the gas charging apparatus so as to stop the charging of the fuel gas, when the temperature in the gas storage container having the lowest internal temperature becomes a balance temperature obtained by subtracting the temperature difference from a preset temperature upper limit value, and the pressure obtained from the pressure information becomes a corresponding pressure corresponding to the balance temperature in the correspondence relation data.

7. The gas charging method according to claim 6, further comprising:
 judging whether or not the temperature obtained from the temperature information becomes the balance temperature obtained by subtracting the temperature difference from the preset temperature upper limit value; and judging whether or not the pressure obtained from the pressure information becomes the corresponding pressure corresponding to the balance temperature in the correspondence relation data wherein controlling the gas charging apparatus is performed according to the results of judging the temperature and judging the pressure.

8. The gas charging method according to claim 6, wherein the preset temperature upper limit value is 85° C.

9. The gas charging method according to claim 6, wherein the step of acquiring the pressure information includes acquiring the pressure information from a pressure detector disposed at a downstream end of the fuel gas charging line.

* * * * *